FIG. I.

INVENTOR.
W. A. GOLDTRAP
BY Hudson & Young
ATTORNEYS

April 4, 1961 W. A. GOLDTRAP 2,978,443
ASH REMOVAL FROM POLYMERIZATION PRODUCTS
Filed June 12, 1957 3 Sheets-Sheet 2

INVENTOR.
W. A. GOLDTRAP
BY Hudson & Young
ATTORNEYS

United States Patent Office 2,978,443
Patented Apr. 4, 1961

2,978,443
ASH REMOVAL FROM POLYMERIZATION PRODUCTS

Walter A. Goldtrap, Bartlesville, Okla., assignor to Phillips Petroleum Company, a corporation of Delaware Filed June 12, 1957, Ser. No. 665,297

13 Claims. (Cl. 260—94.9)

This invention relates to the removal of ash from polymerization products by dissolving the ash in hydrofluoric acid. In another aspect it relates to the recovery of polymer from catalyst.

It has recently been discovered, as disclosed in the copending U.S. patent application of J. P. Hogan and R. L. Banks, Serial No. 573,877, filed March 26, 1956, now U.S. Patent 2,825,721, that unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. The olefin feed used for the polymerization comprises at least one olefin selected from a class of 1-olefins having a maximum of eight carbon atoms per molecule and no branching nearer the double bond than the 4 position. Examples of olefins which can be polymerized by the described method include ethylene, propylene, 1-butene, 1-pentene, and 1,3-butadiene. Copolymers, such as ethylene-propylene copolymers, and ethylene-butadiene copolymers, can also be prepared by utilizing the chromium oxide-containing catalyst.

For many uses, it is necessary that these polymers have a low ash content. Examples of uses which require a low ash content include food containers, bottles, pipes capable of withstanding high pressures, and protective coatings. In accordance with the present invention, it has been discovered that the ash content of these polymers can be reduced substantially by contacting the polymerization product with hydrofluoric acid. The acid appears to dissolve the catalyst employed in the polymerization system. The polymer can be separated from the dissolved material by a suitable filtering step so that the final polymer product is substantially free of catalyst particles. A polymer of extremely low ash content can thus be prepared. The invention is also particularly useful in recovering additional polymer from the catalyst.

Accordingly, it is an object of this invention to provide improved processes for removing ash from polymerization products.

Another object is to provide methods of recovering polymer from catalyst.

Another object is to provide methods of removing catalyst particles of an oxide selected from the group consisting of silica, alumina, zirconia, and thoria from polymerization products.

A further object is to provide methods of treating polymerization products with hydrofluoric acid.

Other objects, advantages and features of the invention should become apparent from the following detailed description which is taken in conjunction with the accompanying drawing in which.

Figure 1:
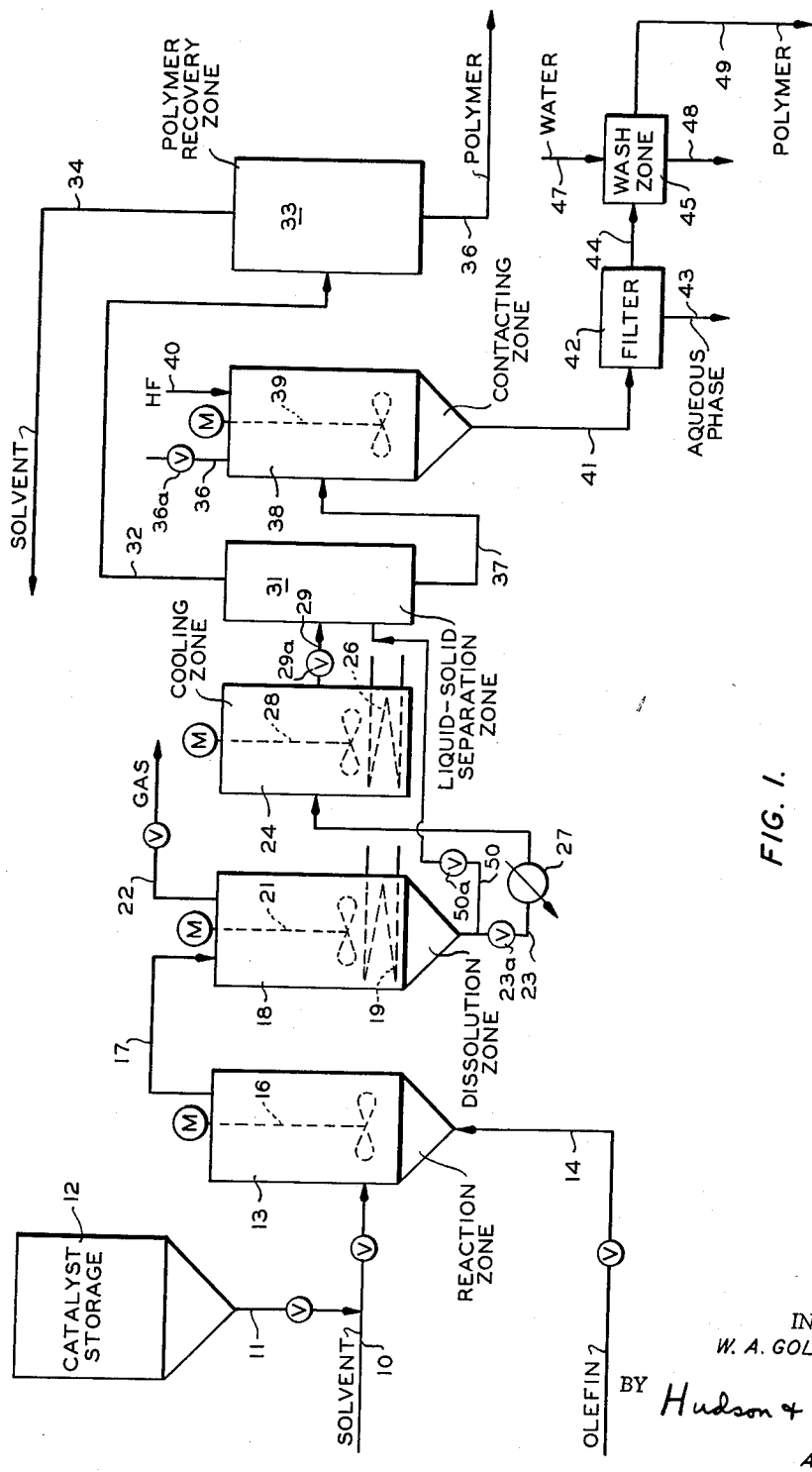
Figure 1 is a schematic representation of a polymerization process having a first embodiment of the ash removal procedure of this invention incorporated therein.

The present invention is broadly applicable to the removal of ash particles from polymerization products. However, the invention is especially applicable to the separation of suspended catalyst from solutions of polymers obtained according to the copending patent application of Hogan and Banks, Serial Number 476,306, filed December 20, 1954, now abandoned. As set forth in this application in detail, unique polymers and copolymers can be produced by contacting one or more olefins with a catalyst comprising, as an essential ingredient, chromium oxide, preferably including a substantial amount of hexavalent chromium. The chromium oxide ordinarily is associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound which is ignitable to chromium oxide. Examples of such compounds include chromium trioxide, chromium nitrate, chromium acetate, and amonium chromate. The composite resulting from the impregnation step is dried and then contacted for a period of several hours at a temperature of from about 450 to 1500° F., preferably from about 900 to 1000° F., with a substantially anhydrous oxygen-containing gas, such as air. The olefin feed used for the polymerization includes at least one olefin selected from the class of 1-olefins having a maximum chain length of 8 carbon atoms and no branching nearer the double bond than the 4-position. Examples of such olefins are ethylene, propylene, 1-butene, 1-pentene, and 1,3-butadiene. Copolymers, such as ethylene-propylene copolymers and ethylene-butadiene copolymers, can be prepared by the described method. The polymerization can be effected at temperatures in the range of 150 to 450° F. The pressure can range from approximately atmospheric to as high as about 1000 p.s.i.

A satisfactory method of conducting the polymerization comprises contacting the olefin or olefins with a slurry of catalyst in a hydrocarbon solvent which can exist as a liquid at the temperature of polymerization. In such a case, the reaction pressure need only be sufficient to maintain the solvent substantially in the liquid phase, and ordinarily ranges from about 100 to 700 p.s.i. When a solvent is so employed, the reaction effluent comprises a mixture of solvent and polymer and contains finely divided suspended catalyst.

Suitable solvents for use in the above described process are hydrocarbons which are liquid and chemically inert under the reaction conditions. Solvents which can advantageously be employed include paraffins, such as those having from 3 to 12, preferably from 7 to 9, carbon atoms per molecule, for example, 2,2,4-trimethylpentane (isooctane), normal hexane, normal decane, isopentane, and the like. Another class of solvents which can be employed are naphthenic hydrocarbons having from 5 to 6 carbon atoms in a naphthenic ring and which can be maintained in the liquid phase under the polymerization conditions. Examples of such naphthenic hydrocarbons include cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. A preferred subclass of naphthenic hydrocarbons within the above-defined general class comprises those naphthenic hydrocarbons having from 5 to 6 carbon atoms in a single ring and from 0 to 2 methyl groups as the only constituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

Figure 1 of the drawing shows a first embodiment of the polymerization process to which the present invention is particularly applicable. This embodiment will be described in conjunction with the polymerization of ethylene using cyclohexane as the solvent. However, the invention is not restricted to these particular materials.

As shown in the drawing, a suitable solvent, such as cyclohexane, enters the system through an inlet line 10. A catalyst, which preferably has a particle size in the range of about 40 to 100 mesh, is added to the solvent by means of line 11 which connects a catalyst storage tank 12 to line 10. The slurry of catalyst in solvent which is thus formed is pumped into a reactor 13. The catalyst can be, for example, a chromium oxide-silica-alumina composite prepared by impregnating a 90 weight percent silica and 10 weight percent alumina gel composition with chromium trioxide, drying, and heating in air to obtain a catalyst composition containing approximately 2.5 weight percent chromium in the form of chromium oxide of which approximately half is in the form of hexavalent chromium.

An olefin, such as ethylene, enters the system through an inlet line 14 and is intimately contacted with the catalyst slurry in reactor 13. A suitable stirring means 16, driven by a motor, is provided to facilitate contacting and to main the catalyst in suspension in the reaction mixture. The reaction zone can be maintained, for example, at 275° F., and 500 p.s.i. with the reaction time ranging from about 15 minutes to about 10 hours. The reactor effluent, which is withdrawn through a line 17, comprises a mixture of polymer, solvent, suspended catalyst, and small amounts of unreacted ethylene. Additional solvent can be added to line 17, if desired, in order to maintain a mixture having a suitable viscosity for transfer through the system. The concentration of polymer is ordinarily maintained at a value in the range from about 1 to 15 weight percent, based on polymer plus solvent. The resulting mixture is passed into a dissolution zone 18 wherein the mixture is heated by a heating means, such as a heating coil 19, and agitated by means of a stirring means 21 to insure complete solution of polymer in the solvent. The dissolution zone is generally maintained at temperatures from 25 to 50° F. higher than reactor 13, suitable temperature ordinarily being approximately 300 to 325° F. The pressure in dissolution zone 18 is ordinarily lower than that in reactor 13, for example, about 75 to 150 p.s.i lower, but is still high enough to maintain the solvent in the liquid phase. The increased temperature and the reduced pressure can be utilized to remove any unreacted ethylene or other gas, which can be withdrawn through an outlet line 22.

The resulting solution containing suspended catalyst is removed from dissolution zone 18 by means of a line 23, having a valve 23a therein, and passed into a cooling zone 24. Cooling zone 24 is provided with a suitable cooling means, such as a cooling coil 26. It is also possible to effect the cooling in the cooling zone by direct heat exchange means rather than indirect means as shown, such as by the addition of cold solvent to the cooling zone. If desired, a cooler 27 can be provided in line 23 to accomplish a partial cooling of the polymer solution prior to its introduction into the cooling zone. In the cooling zone, the polymer solution is cooled to a temperature sufficiently low to cause precipitation of a minor proportion of the polymer in solution. The solution in the cooling zone is agitated by a stirring means 28 so as to prevent settling of the precipitated polymer. The temperature at which it is desired to operate the cooling zone is, in general, between zero and 50° F. above the lower cloud point of the particular polymer solution being treated. It has been found that when operating in this temperature range, about 1 to 15 percent of the polymer in solution is caused to precipitate. The polymer in precipitating adheres to the finely divided catalyst suspended in the polymer solution, thereby causing the particles to agglomerate and form larger size particles. The agglomeration of the catalyst particles is assisted by the stirring of the polymer solution, which causes the catalyst particles and adhering polymer to contact one another.

The resulting slurry of solid polymer and catalyst is removed from the cooling zone through a line 29, having a valve 29a therein, and passed into a liquid-solid separation zone 31. This zone may be a settling tank, a cyclone separator, a centrifuge, a filter, or other suitable means for accomplishing the separation of a liquid from solids. A substantially catalyst-free solution containing a major proportion of the polymer product is recovered from separation zone 31 by means of a line 32 and passed to a polymer recovery zone 33. Zone 33 can be any suitable means for recovering polymer from a solution thereof in a solvent and can comprise, for example, a series of evaporation steps as described in more detail in the copending application of Martin R. Cines, Serial No. 496,515, filed March 24, 1955. The recovery zone can also comprise cooling and filtration means whereby the dissolved polymer is precipitated from solution by cooling the solvent to a temperature below the lower cloud point and subsequently filtering. Solvent recovered from zone 33 through a line 34 can be recycled to line 10. A polymer, which may have a lower average molecular weight than that of the total polymer produced in reaction zone 13, is recovered through an outlet line 36. This polymer preferably has a molecular weight only slightly lower than that of the total polymer produced, and this is accomplished, as previously described, by precipitating in cooling zone 24 only a minimum of polymer which has a very high molecular weight as compared to that of the total polymer produced. It is also possible to utilize a filter, such as a cartridge-type filter, in line 32 in order to effect the removal of catalyst which may still remain in the polymer solution recovered from zone 31. The use of a cartridge-type filter in this line is made possible by the fact that substantially all of the solid material has been separated from the solution in zone 31.

The separated polymer phase containing most of the suspended catalyst is withdrawn from zone 31 through a line 37 which communicates with a contacting zone 38 that is provided with a stirrer 39. Hydrofluoric acid is added to zone 38 through a line 40. Zone 38 is provided with a vent line 36, having a valve 36a therein, to permit removal of gaseous hydrogen fluoride and silicon fluoride. The polymer phase removed from zone 31 is thus intimately contacted with the hydrofluoric acid in zone 38. The contacted material is subsequently withdrawn through a line 41 which communicates with the inlet of a filter 42. Filter 42 can be any commercially available filter capable of separating solids from liquids. The aqueous phase from filter 42 is removed through a line 43, and the filter cake is transferred through a line 44 to a wash zone 45. Water is added to zone 45 by means of a line 47 and is subsequently removed through a line 48. Additional polymer product is withdrawn through a line 49.

The catalyst which is contained in the polymer phase that is directed to zone 38 is dissolved by the hydrofluoric acid therein. This dissolved catalyst is subsequently removed from the system through line 43. The filter cake from filter 42 contains the polymer to be recovered and whatever solvent is present in the mixture supplied to zone 38. The polymer is washed in zone 45 with a sufficient amount of water to remove substantially all traces of acid. The final product removed through conduit 49 can be dried before being passed to a final product zone, if desired.

As an example of the catalyst removal step of Figure 1, the mixture directed to zone 38 is agitated with aqueous HF (60 weight percent HF) at a temperature of approximately 100° F. The residence time of the treated material in zone 38 is approximately 30 minutes. The catalyst content of the final product removed through line 49 is approximately 0.02 weight percent.

A conduit 50, having a valve 50a therein, communicates between zone 18 and zone 31. In the embodiment previously described, this valve is closed. If desired, valve 50a can be opened and valves 23a and 29a closed. The effluent from zone 18 then is passed directly to zone 31.

Figure 2:
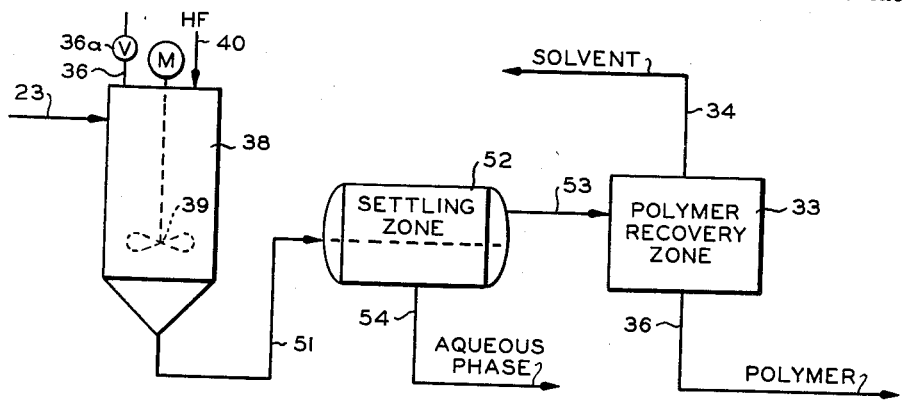
Figure 2 is a schematic representation of a second embodiment of the ash removal procedure.

In Figure 2 of the drawing, there is shown a second embodiment of the polymerization product treating procedure of this invention. The effluent from zone 18 of Figure 1 is transferred by a line 23 directly to the contacting zone 38. The effluent from zone 38 is transferred by a line 51 to a settling zone 52 wherein the aqueous and hydrocarbon phases are separated. The hydrocarbon phase is withdrawn through a line 53 which communicates with the inlet of a polymer recovery zone 33 which can be of the type previously described in conjunction with Figure 1. The aqueous phase which contains the dissolved catalyst is removed from the system through a conduit 54.

As an example of the polymer treating system of Figure 2, the effluent from zone 18 is agitated with aqueous HF of 38 weight percent concentration at a temperature of 300° F. and a pressure of 500 p.s.i.a. in zone 38. The capacity of zone 38 is such that a residence time of approximately 15 minutes is provided. The catalyst content of the polymer recovered through conduit 36 is approximately 0.02 weight percent.

Figure 3:
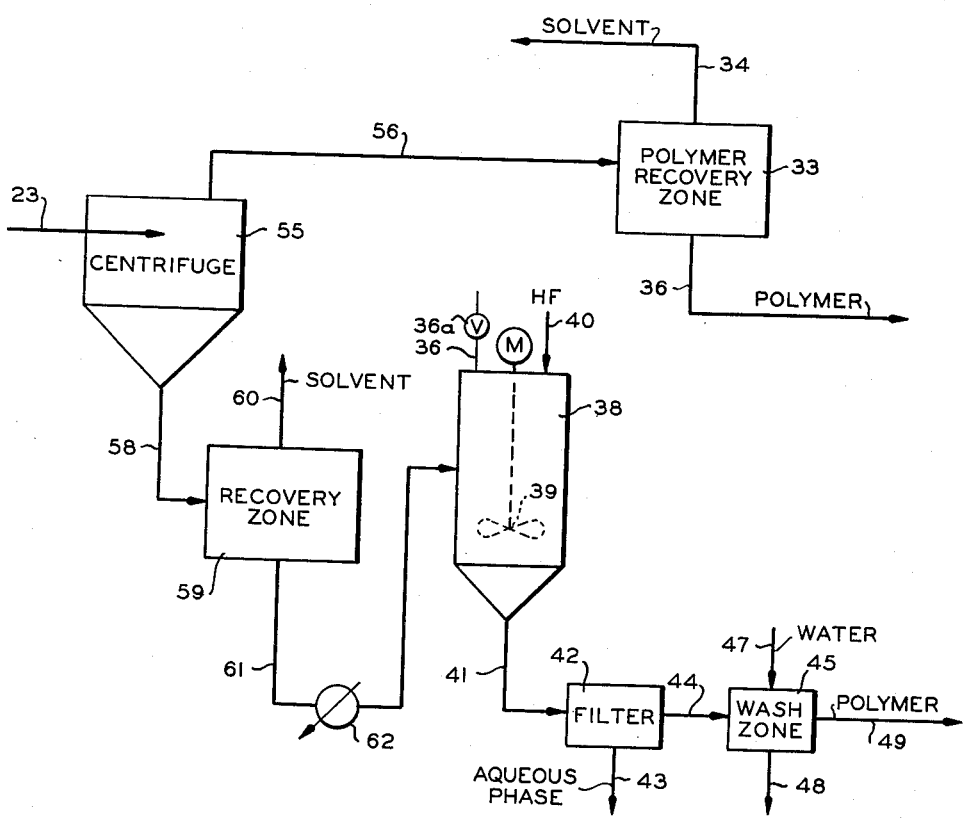
Figure 3 is a schematic representation of a third embodiment of the ash removal procedure.

In Figure 3, there is shown a third embodiment of the polymerization product treating procedure of this invention. The effluent from zone 18 of Figure 1 is passed by a line 23 to the inlet of a centrifuge 55. The overflow stream from centrifuge 55 is passed by a line 56 to a polymer recovery zone 33 which can be of the type described in conjunction with Figure 1. The underflow stream from centrifuge 55 is passed by a line 58 to a recovery zone 59. The major portion of the solvent is therein vaporized and removed through a line 60. A sufficient amount of solvent is retained in the system to maintain the remaining solids flowable. This mixture is passed by a line 61 to the inlet of a contacting zone 38. Line 61 can have a cooler 62 incorporated therein to reduce the temperature of the mixture supplied to contacting zone 38. The materials removed from zone 38 are treated in the same manner as described in conjunction with Figure 1.

Figure 4:
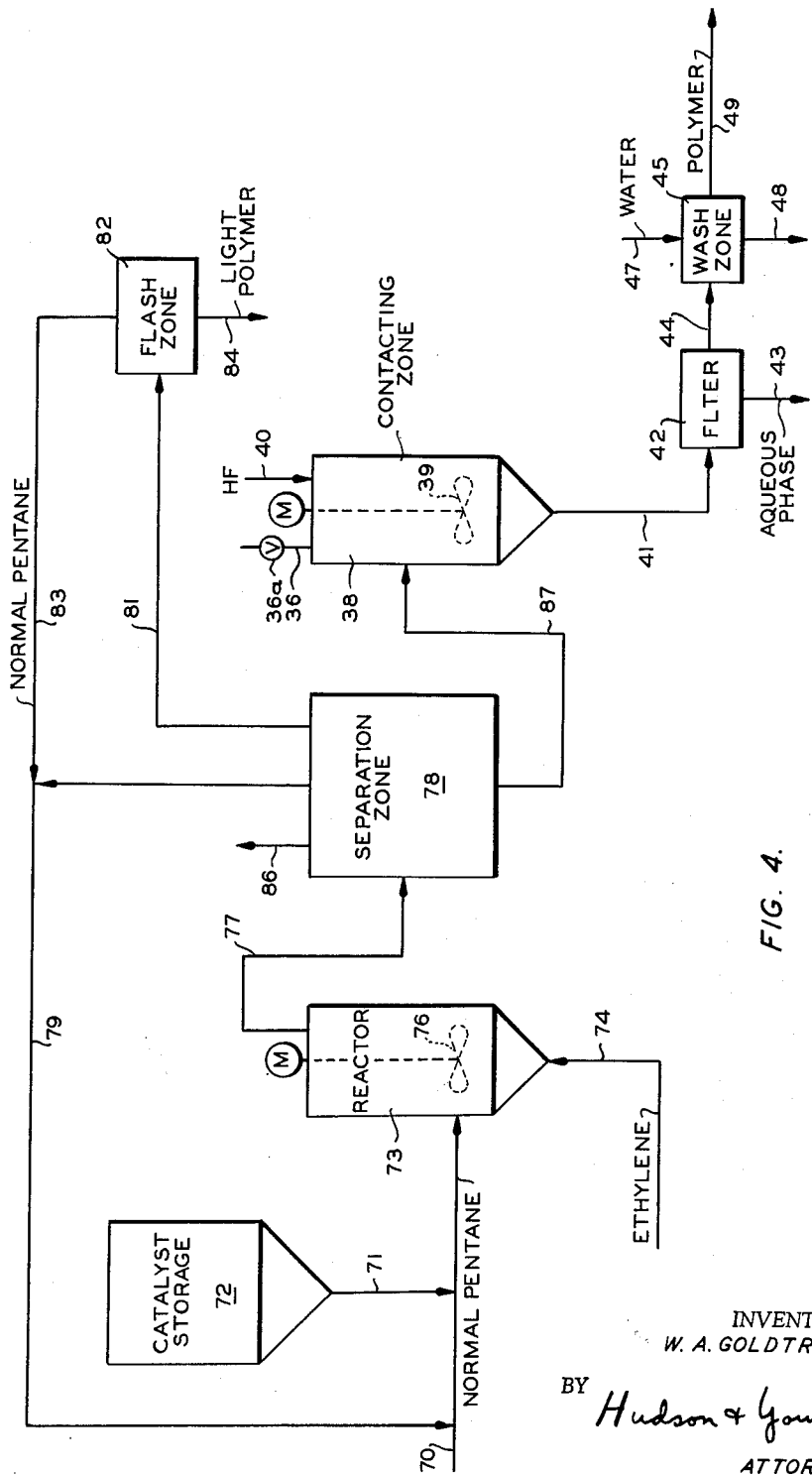
Figure 4 is a schematic representation of a second embodiment of a polymerization process having the ash removal procedure of this invention incorporated therein.

In Figure 4, there is shown a second embodiment of a polymerization system to which the ash removal procedure of the present invention is particularly applicable. The polymerization proces of Figure 4 comprises contacting ethylene or mixtures of ethylene with other 1-olefins of the type previously described with a suspension of chromium oxide-containing catalyst in a liquid hydrocarbon diluent, the contacting occurring at a temperature such that substantially all of the polymer produced is insoluble in the diluent and in solid particle form, the particles being substantially non-tacky and non-agglutinative and suspended in the liquid diluent.

The liquid hydrocarbon diluent serves as an inert dispersant and heat transfer medium. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule can advantageously be utilized. Examples of paraffins which can be so employed include propane, n-butane, n-pentane, isopentane, n-hexane, n-decane, 2,2,4-trimethylpentane (isooctane), and the like. It is to be understood that some naphthenes can be tolerated in the liquid paraffin, and that mixtures of paraffins and/or isoparaffins can be employed. Another class of hydrocarbons which can be employed are naphthenic hydrocarbons having from 5 to 6 carbon atoms in a naphthenic ring and which can be maintained in the liquid phase under the polymerization conditions. Examples of such naphthenic hydrocarbons include cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. A preferred subclass of naphthenic hydrocarbons within the above described general class comprises those naphthenic hydrocarbons having from 5 to 6 carbon atoms in a single ring and from 0 to 2 methyl groups as the only substituents on the ring. Thus, the preferred naphthenic hydrocarbons are cyclopentane, cyclohexane, methylcyclopentane, methylcyclohexane, the dimethylcyclopentanes, and the dimethylcyclohexanes. It is also possible to utilize mixtures of paraffinic and naphthenic hydrocarbons as the reaction medium.

When utilizing butane and higher paraffinic hydrocarbons as the reaction medium, the polymerization temperature is generally in the range of about 230° F. and below, preferably 225° F. and below. Propane, which has a critical temperature of about 206° F., is useful under conditions at which it can be maintained in the liquid phase. The temperature range for naphthenic hydrocarbons is about 190° F. and below, preferably about 180° F. and below. If mixtures of paraffins and naphthenic hydrocarbons are employed, the upper temperature limit is generally between about 190 and 230° F., depending upon the composition of the mixture.

With regard to the upper temperature limits set forth, in the case of paraffinic diluents, the temperature is approximately 230° F. and for cycloparaffinic diluents approximately 190° F. There is a very narrow temperature range or area where the transformation, i.e., from tacky, agglomerated polymer to granular polymer, takes place, and conditions can be varied so as to change the absolute upper limit slightly. However, the absolute upper limits for paraffins and cycloparaffins are approximately the temperatures indicated, and at the preferred upper limits, granular polymer is formed in all cases. The lower temperature limit for practicing the process of this invention is not critical, but the reaction rate is undesirably low below 150° F. and generally impractical below 100° F.

Various reaction systems can be utilized in practicing the process of Figure 4, including mechanically agitated or stirred reactors and jet agitated reactors. These types of reaction systems are described in the literature, and for this reason are not described in detail herein. When operating agitated reactors, the reaction mixture comprises solid polymer particles containing catalyst, suspended because of the agitation of the liquid hydrocarbon. Substantially all of the polymer produced is in solid particle form, only a small amount (usually not over 1 or 2 weight percent of the total polymer) of light polymer being dissolved in the liquid hydrocarbon.

Polymerization of ethylene with a chromium oxide-containing catalyst in a system in which the catalyst is in suspension in a liquid hydrocarbon can be carried out at temperatures which can be divided into three separate ranges. For convenience of discussion, these temperature ranges can be designated as the low range, the intermediate range, and the high range. In the case of paraffinic diluents, the low range is from 230° F. and below, the intermediate range is from 230° F. to 250° F., and the high range from 250° F. and above. For cycloparaffinic diluents, the low range is from 190° F. and below, the intermediate range from 190° F. to 230° F., and the high range from 230° F. and above. The polymerization of ethylene in the presence of a chromium oxide-containing catalyst can be carried out effectively in all of these three temperature ranges. However, as will become apparent from the following discussion, certain unexpected results and advantages come about when operating the system of Figure 4 in the low polymerization temperature range.

When operating in the low temperature range, substantially all of the polymer formed remains as a solid in the form of small particles which contain the catalyst. The liquid hydrocarbon, which is used as the reaction medium, dissolves very little of the polymer so that the hydrocarbon retains its low viscosity. In part because of this low viscosity and in part because of the non-agglomerating properties of the polymer-catalyst particles formed, the desirable operating characteristics of easy mixing and good heat transfer are maintained with polymer concentrations as high as 25 percent of the reaction mixture. Under some conditions, the process can be operated with polymer concentrations as high as 30 percent and higher. Ease of mixing is important because of low power demands while good heat transfer characteristics are desirable in facilitating temperature control of the exothermic reaction.

As shown in Figure 4, a liquid hydrocarbon, such as normal pentane, enters the system through a line 70. A catalyst, which preferably has a particle size of 50 mesh or smaller, is added to the liquid hydrocarbon by means of a line 71 which connects a catalyst storage tank 72 to line 70. The slurry of catalyst in normal pentane, which is thus formed, is passed into a reactor 73. The catalyst can be, for example, a chromium oxide-silica alumina catalyst prepared by impregnating a 90 weight percent silica and 10 weight per cent alumina gel composite with chromium trioxide, drying, and heating in air to obtain a catalyst composition containing approximately 2.0 weight percent chromium in the form of chromium oxide of which approximately half is in the form of hexavalent chromium.

Ethylene enters the system through a line 74 and is intimately contacted with the catalyst suspension or slurry in reactor 73. It is to be understood that mixtures of ethylene with other unsaturated hydrocarbons, e.g., mixtures of ethylene with minor amounts of higher 1-olefins, such as propylene, 1-butene, 1-pentene, 1-hexene, and the like, can be polymerized in accordance with the system of Figure 4. Examples of other comonomers which can be employed include: (1) olefins which are isomerizable under polymerization conditions into 1-olefins having no branching closer than the 4-position, such as 2-butene and 2-pentene, (2) 1,3-diolefins having no branching closer than the 3-position, such as 1,3-butadiene and 3-methyl-1,3-pentadiene, (3) non-conjugated diolefins having at least one terminal double bond and no branching closer than the 4-position, such as 1,4-pentadiene and 4-methyl-1,4-hexadiene, and (4) non-conjugated diolefins isomerizable under polymerization conditions to unsaturated hydrocarbons of (2) or (3), such as 2,5-heptadiene.

A suitable stirring means 76, driven by a motor is provided to facilitate contacting and to maintain the catalyst in suspension in the reaction mixture. The reaction zone is maintained at a temperature such that the polymer produced is substantially insoluble in the normal pentane and is in solid particle form. As indicated above, when utilizing a paraffinic hydrocarbon such as normal pentane, this temperature is in the range of about 230° F. and below, preferably 225° F. and below. When naphthenic hydrocarbons are employed, the polymerization temperature is in the range of about 190° F. and below, preferably 180° F. and below. While there appears to be nothing critical about the lower temperature to which the polymerization can be carried out, as a practical matter it is desirable in the case of paraffins and cycloparaffins that the temperature not be below 150° F. The pressure in reactor 73 is such that the normal pentane is maintained substantially in the liquid phase. Although there is nothing critical about the reaction pressure other than that it be sufficient to maintain the reaction medium in the liquid phase, the pressure is generally in the range of 100 to 700 p.s.i.

The reactor effluent which is withdrawn through a line 77 comprises a mixture of solid polymer particles containing catalyst, normal pentane, and small amounts of unreacted ethylene. Since the reaction is carried out at a temperature such that the polymer produced is substantially insoluble in the normal pentane, only a small amount of light polymer is dissolved in the reaction medium. The mixture is passed into a separation zone 78 wherein the polymer containing catalyst and the normal pentane are separated. The separation zone can comprise any suitable separation means, such as a filter, centrifuge, settling tank, or other suitable means for accomplishing the separation of a liquid from solids. One of the important advantages of the system of Figure 4 is that separation of the polymer from liquids is readily and easily accomplished because of the particle form in which the polymer is produced. It is also possible to separate the normal pentane from the polymer merely by flashing off the liquid hydrocarbon.

Normal pentane recovered from separation zone 78 can be recycled to line 70 by means of a line 79. As previously mentioned, a small amount of light polymer may be dissolved in the normal pentane. In order to provide for the removal of this light polymer from the system, some of the normal pentane recovered from separation zone 78 can be passed by a line 81 into a flash tank 82. In flash tank 82, the normal pentane is flashed off and then recycled by means of a line 83 to line 79 for further recycle to line 70. A polymer of low molecular weight is withdrawn from the flash tank through a line 84. A line 86 is connected to separation zone 78 to provide means for removing unreacted ethylene or other gas from this zone.

The solids from zone 78, and sufficient liquid to retain the solids flowable, are passed by a line 87 to a contacting zone 38. Zone 38 and the remainder of the apparatus of Figure 4 is of the type described in conjunction with Figure 1. As an example of the operation of the separation system of Figure 4, polyethylene containing approximately 0.1 weight percent catalyst is agitated with a large excess of aqueous HF (38.2 weight percent HF) at room temperature for 30 minutes. The ash content of the treated polymer is approximately 0.05 weight percent.

From the foregoing description of presently preferred embodiments of this invention, it should be apparent that there is provided an improved method of removing ash from polymerization products. The resulting products have extremely low ash contents and for this reason are useful when the polymers are employed for the purposes hereinbefore mentioned. The presently preferred catalyst previously described contains nearly 90 percent silica. The principal reaction involved in the removal of this catalyst by the hydrofluoric acid is:

$$4HF + SiO_2 \rightarrow SiF_4 + 2H_2O$$

It is preferred that the concentration of aqueous HF employed in carrying out this invention be in the range of 30 to 40 weight percent. The constant boiling mixture which contains 38.2 weight percent HF and boils at 112.2° C. is particularly well suited for use in the process of this invention. However, stronger or weaker solutions or anhydrous HF can be used.

While the invention has been described in conjunction

What is claimed is:

1. In the production of polymers of 1-olefins by contacting the olefins, under polymerizing conditions, with a catalyst comprising chromium oxide, at least part of the chromium being in the hexavalent state, and at least one oxide selected from the group consisting of silica, alumina, zirconia and thoria, the method of removing catalyst from the polymerization product which comprises contacting the polymerization product with hydrofluoric acid so as to dissolve at least a portion of said catalyst and separating the polymer from the resulting dissolved catalyst.

2. The method of claim 1 wherein the hydrofluoric acid comprises from 30 to 40 weight percent of hydrogen fluoride.

3. The method of claim 1 wherein the hydrofluoric acid comprises 38.2 weight percent hydrogen fluoride.

4. In the production of polymers of 1-olefins by contacting the olefins, under polymerizing conditions, with a catalyst comprising chromium oxide, at least part of the chromium being in the hexavalent state, and at least one oxide selected from the group consisting of silica, alumina, zirconia and thoria, the method of removing catalyst from the polymerization product which comprises contacting the polymerization product with hydrofluoric acid so as to dissolve at least a portion of said catalyst, filtering the contacted mixture to separate the polymer from dissolved catalyst, and contacting the separated polymer with water to remove acid therefrom.

5. In the production of polymers of 1-olefins by contacting the olefins, under polymerizing conditions, with a catalyst comprising chromium oxide, at least part of the chromium being in the hexavalent state, and at least one oxide selected from the group consisting of silica, alumina, zirconia and thoria, wherein the major proportion of the catalyst is silica, in the presence of a normally liquid hydrocarbon solvent, the method of removing catalyst from the polymerization product which comprises contacting the polymerization product with hydrofluoric acid so as to dissolve at least a portion of said catalyst, passing the contacted mixture to a settling zone, removing the hydrocarbon phase from said zone, and separating the polymer from the hydrocarbon solvent.

6. In the production of polymers of 1-olefins having a maximum of eight carbon atoms per molecule and no branching nearer the double bond than the 4-position by contacting the olefins, under polymerizing conditions, with a catalyst comprising a minor proportion of chromium oxide, at least a part of the chromium being in the hexavalent state, and at least one other oxide selected from the group consisting of silica, alumina, zirconia and thoria, wherein the major proportion of the catalyst is silica, the method of removing catalyst from the polymerization product which comprises contacting the polymerization product with hydrofluoric acid so as to dissolve at least a portion of said catalyst, and separating the polymer from the resulting dissolved catalyst.

7. In the production of solid polyethylene by contacting ethylene, under polymerizing conditions with a catalyst comprising chromium oxide, at least a part of the chromium being in the hexavalent state, and a silica-alumina composite comprising about 90 parts by weight silica and about 10 parts by weight alumina, said catalyst containing about 2.5 weight percent chromium and having a particle size in the range of about 40 to 100 mesh, the method of reducing the ash content of the polymerization product which comprises contacting the polymerization product with hydrofluoric acid containing 30 to 40 weight percent hydrogen fluoride, and separating the polymer from the resulting dissolved catalyst.

8. The method of producing polymers of 1-olefins having a maximum of eight carbon atoms per molecule and no branching nearer the double bond than the 4-position which comprises contacting the olefins, under polymerizing conditions, with a catalyst comprising a minor proportion of chromium oxide, at least a part of the chromium being in the hexavalent state, and at least one other oxide selected from the group consisting of silica, alumina, zirconia and thoria, wherein the major proportion of the catalyst is silica, in the presence of a normally liquid hydrocarbon solvent, passing the reaction products to a liquid-solid separation zone, contacting the solids separated in said zone with hydrofluoric acid so as to dissolve at least a portion of said catalyst, and separating polymer from the catalyst dissolved by said acid.

9. The method of claim 8 wherein the hydrofluoric acid comprises from 30 to 40 weight percent of hydrogen fluoride.

10. The method of claim 8 wherein the hydrofluoric acid comprises 38.2 weight percent hydrogen fluoride.

11. The method of producing polymers of 1-olefins having a maximum of eight carbon atoms per molecule and no branching nearer the double bond than the 4-position which comprises contacting the olefins, under polymerizing conditions, with a catalyst comprising a minor proportion of chromium oxide, at least a part of the chromium being in the hexavalent state, and at least one other oxide selected from the group consisting of silica, alumina, zirconia and thoria wherein the major proportion of the catalyst is silica, in the presence of a normally liquid hydrocarbon solvent, passing the reaction products to a liquid-solid separation zone, contacting the solids separated in said zone with hydrofluoric acid so as to dissolve at least a portion of said catalyst, filtering the contacted mixture to separate the polymer from dissolved catalyst, and contacting the separated polymer with water to remove acid therefrom.

12. The method of producing polymers of 1-olefins having a maximum of 8 carbon atoms per molecule and no branching nearer the double bond than the 4-position which comprises contacting the olefin with a catalyst comprising a minor proportion of chromium oxide, at least a part of the chromium being in the hexavalent state, and at least one other oxide selected from the group consisting of silica, alumina, zirconia and thoria, under polymerizing conditions, in the presence of a normally liquid hydrocarbon solvent, cooling the reaction products to a temperature sufficient to precipitate a minor proportion of the polymer and substantially all of the catalyst, passing the reaction products to a liquid-solid separation zone, removing the liquid solvent containing the major proportion of the polymer dissolved therein, contacting the solids separated in said zone with hydrofluoric acid so as to dissolve at least a portion of said catalyst, removing the polymer from the hydrofluoric acid containing therein dissolved catalyst, and contacting the separated polymer with water to remove acid therefrom.

13. The method of claim 12 wherein the olefin is ethylene and the normally liquid hydrocarbon solvent is cyclohexane.

References Cited in the file of this patent
FOREIGN PATENTS 533,362    Belgium _____ May 16, 1955